United States Patent
Kim et al.

(10) Patent No.: US 10,285,022 B2
(45) Date of Patent: May 7, 2019

(54) METHOD AND APPARATUS FOR SIGNAL TRANSMISSION AND RECEPTION OF HSS/MME IN WIRELESS COMMUNICATION SYSTEM

(71) Applicant: LG ELECTRONICS INC., Seoul (KR)

(72) Inventors: Laeyoung Kim, Seoul (KR); Jinsook Ryu, Seoul (KR); Hyunsook Kim, Seoul (KR); Jaehyun Kim, Seoul (KR); Taehun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/310,406

(22) PCT Filed: May 11, 2015

(86) PCT No.: PCT/KR2015/004683
§ 371 (c)(1),
(2) Date: Nov. 10, 2016

(87) PCT Pub. No.: WO2015/174702
PCT Pub. Date: Nov. 19, 2015

(65) Prior Publication Data
US 2017/0272921 A1    Sep. 21, 2017

Related U.S. Application Data

(60) Provisional application No. 61/991,596, filed on May 11, 2014.

(51) Int. Cl.
*H04W 4/14* (2009.01)
*H04W 8/06* (2009.01)
(Continued)

(52) U.S. Cl.
CPC ............... *H04W 4/14* (2013.01); *H04W 8/04* (2013.01); *H04W 8/06* (2013.01); *H04W 60/00* (2013.01);
(Continued)

(58) Field of Classification Search
CPC ......... H04W 4/14; H04W 8/06; H04W 88/14; H04W 80/12; H04W 92/24; H04W 36/14;
(Continued)

(56) References Cited

U.S. PATENT DOCUMENTS 9,307,390 B2 *  4/2016  Lei ........................ H04W 4/08
9,883,372 B2 *  1/2018  Shi ........................ H04W 4/12
(Continued)

FOREIGN PATENT DOCUMENTS

WO    2013051826 A2    4/2013
WO    2013133564 A1    9/2013

OTHER PUBLICATIONS

NTT DoCoMo et al., "Discussion on Core Network Type Selection based on the Subscription Information—Report of Offline Discussion", S2-134328, 3GPP TSG SA WG2 #100, Nov. 11-15, 2013.
(Continued)

*Primary Examiner* — Khawar Iqbal
(74) *Attorney, Agent, or Firm* — Dentons US LLP

(57) ABSTRACT

In a method for signal transmission and reception of a home subscriber server (HSS) in a wireless communication system, according to an embodiment of the present invention, the method for signal transmission and reception of the HSS comprises the steps of: receiving a uniform resource locator (URL) from a mobility management entity (MME) which has received an attach request transmitted by a user equipment (UE); and determining whether it is appropriate for the MME to provide service to the UE on the basis of the URL, wherein the URL includes at least one piece of information
(Continued)

on whether the MME belongs to a dedicated core network, or on the type of dedicated core network to which the MME belongs if the MME belongs to a dedicated core network.

7 Claims, 8 Drawing Sheets

(51) Int. Cl.
H04W 72/10 (2009.01)
H04W 8/04 (2009.01)
H04W 60/00 (2009.01)
H04W 80/12 (2009.01)
H04W 88/14 (2009.01)
H04W 92/24 (2009.01)

(52) U.S. Cl.
CPC ............ H04W 80/12 (2013.01); H04W 88/14 (2013.01); H04W 92/24 (2013.01)

(58) Field of Classification Search
CPC ......... H04W 8/08; H04W 72/10; H04W 8/02; H04W 8/04; H04W 52/0216; H04W 8/18; H04W 8/22; H04W 48/02; H04W 52/0219
See application file for complete search history.

(56) References Cited

U.S. PATENT DOCUMENTS

| | | | | |
|---|---|---|---|---|
| 2013/0150029 A1* | 6/2013 | Jeong | ...................... | H04W 8/06 455/432.3 |
| 2013/0208659 A1* | 8/2013 | Nishida | ................... | H04W 8/22 370/328 |
| 2014/0198637 A1* | 7/2014 | Shan | ................... | H04W 52/243 370/229 |
| 2015/0065125 A1* | 3/2015 | Patel | ....................... | H04W 8/12 455/433 |
| 2015/0109966 A1* | 4/2015 | Hong | ...................... | H04W 4/14 370/259 |
| 2015/0156622 A1* | 6/2015 | Shi | .......................... | H04W 4/12 370/328 |
| 2015/0257044 A1* | 9/2015 | Jiang | ....................... | H04W 8/12 455/433 |
| 2015/0264553 A1* | 9/2015 | Janosi | ..................... | H04W 8/12 455/433 |
| 2016/0183156 A1* | 6/2016 | Chin | ................. | H04W 36/0022 370/331 |
| 2016/0227457 A1* | 8/2016 | Tanaka | ..................... | H04W 8/04 |
| 2016/0359750 A1* | 12/2016 | Miklos | ................... | H04L 47/24 |
| 2017/0048758 A1* | 2/2017 | Shu | ........................ | H04W 8/06 |
| 2017/0055194 A1* | 2/2017 | Cho | ........................ | H04W 8/08 |

OTHER PUBLICATIONS

NTT DoCoMo et al., "Discussion on Core Network Type Selection based on the Subscription Information", S2-133909, 3GPP TSG SA WG2 #100, Nov. 11-15, 2013.

NTT DoCoMo et al., "Addition of Subscription Information for Selecting a Specific Network", S2-133910, 3GPP TSG-SA WG2 Meeting #100, Nov. 11-15, 2013.

* cited by examiner

METHOD AND APPARATUS FOR SIGNAL TRANSMISSION AND RECEPTION OF HSS/MME IN WIRELESS COMMUNICATION SYSTEM

This application is a National Phase Application of International Application No. PCT/KR2015/004683, filed on May 11, 2015, which claims the benefit of U.S. Provisional Application No. 61/991,596, filed May 11, 2014, which are hereby incorporated by reference in their entirety for all purposes as if fully set forth herein.

TECHNICAL FIELD

The present invention relates to a wireless communication system, and more particularly, to a method of transmitting/receiving a signal of HSS/MME and apparatus therefor.

BACKGROUND ART

An MTC (Machine Type Communication) means a communication scheme including one or more machines and is also called M2M (Machine-to-Machine) communication or object communication. In this case, the machine means an entity which does not need a person's direct manipulation or intervention. For example, a user device such as a smartphone capable of performing communication by automatically connecting to a network without a user's manipulation/intervention as well as a device such as a meter or a vending machine having a mobile communication module mounted thereon may correspond to an example of the machine. In the present document, each of various examples of such machines is called an MTC device or a user equipment. Namely, the MTC means a communication performed by one or more machines (i.e., MTC devices) without a person's manipulation/intervention.

The MTC may include communication between MTC devices (e.g., D2D (Device-to-Device) communication) and communication between an MTC device and an MTC application server (AS). Some examples of communication between the MTC device and the MTC application server (AS) may include communication between a vending machine and a service, communication between a POS (Point of Sale) device and a server and communication between an electric, gas or water meter and a server. Moreover, MTC-based applications may include security, transportation, health care and the like.

The MTC device may be on a standby state that a connection for data transmission and reception is not established in order to minimize power consumption and then establish the connection by a request or instruction. Such a request or instruction may be called an MTC device triggering message.

DISCLOSURE OF THE INVENTION

Technical Task

The technical task of the present invention is to provide a method for a handling of an SMS when an MME is changed on a dedicated network.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is a method of transmitting and receiving a signal by an HSS (home subscriber server) in a wireless communication system, including receiving a ULR from an MME (Mobility Management Entity) having received an attach request transmitted by a UE (User Equipment) and determining whether it is appropriate for the MME to service the UE based on the ULR, wherein the ULR includes at least one of information indicating whether the MME belongs to a dedicated core network and information indicating if the MME belongs to a dedicated core network, whether the MME belongs to a prescribed type of the dedicated core network.

In a second technical aspect of the present invention, provided herein a HSS (home subscriber server) device in a wireless communication system, including a transceiver and a processor, wherein the processor receives a ULR from an MME (Mobility Management Entity) having received an attach request transmitted by a UE and determines whether it is appropriate for the MME to service the UE and wherein the ULR includes at least one of information indicating whether the MME belongs to a dedicated core network and information indicating if the MME belongs to the dedicated core network, whether the MME belongs to a prescribed type of the dedicated core network.

In a third technical aspect of the present invention, provided herein is a method of transmitting/receiving a signal by an MME in a wireless communication system, including receiving an attach request transmitted by an UE and transmitting a ULR related to the UE to an HSS, wherein the ULR includes at least one of information indicating whether the MME belongs to a dedicated core network and information indicating if the MME belongs to the dedicated core network, whether the MME belongs to a prescribed type of the dedicated core network.

In a fourth technical aspect of the present invention, provided herein is an MME device in a wireless communication system, including a transceiver and a processor, wherein the processor receives an attach request transmitted by a UE and transmits a ULR related to the UE to an HSS and wherein the ULR includes at least one of information indicating whether the MME belongs to a dedicated core network and information indicating if the MME belongs to the dedicated core network, whether the MME belongs to a prescribed type of the dedicated core network.

First to fourth technical aspects of the present invention may include one or more of the following points.

The determination may be made only if the MME is an SMS in MME.

The method may further include receiving a message for requesting routing information from an SMS-GMSC (Short Message Service-gateway Mobile Switching Centre).

If it is determined that it is not appropriate for the MME to service the UE, the HSS may not provide information on the MME to the SMS-GMSC.

If it is determined that it is not appropriate for the MME to service the UE, the HSS may transmit information indicating that a user is absent or not reachable to the SMS-GMSC.

If the MME belongs to the dedicated core network, the information indicating if the MME belongs to the dedicated core network, whether the MME belongs to the prescribed type of the dedicated core network may include a Core Network Type value.

If it is determined that it is not appropriate for the MME to service the UE, the HSS may assume that the MME will be reselected.

If it is determined that it is not appropriate for the MME to serve the UE, the HSS may update information related to the MME.

The updated information related to the MME may include at least one of information indicating that the MME will be reselected for the UE, information indicating that there is no MME serving the UE, information indicating that the MME does not belong to an appropriate dedicated core network for the UE, information indicating that the MME is not appropriate/suitable for the UE, and information indicating that a serving node for the UE cannot delete/cancel the MME or the MME cannot transmit an SMS.

The information included in the ULR may be used for the HSS to determine whether it is appropriate for the MME to service the UE.

Advantageous Effects

According to the present invention, when an MME is changed in a dedicated network, signaling overhead and/or considerable procedures required for SMS delivery can be reduced.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
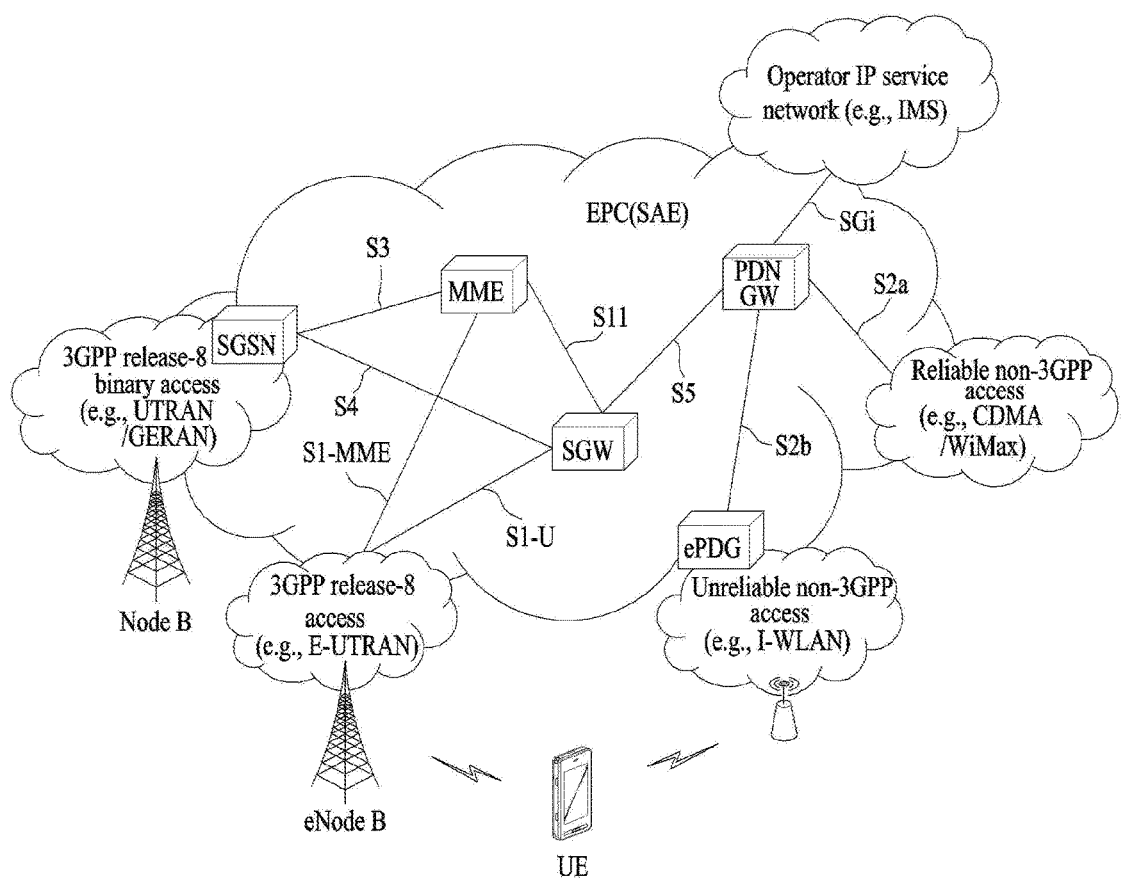
FIG. 1 is a diagram to schematically illustrate a structure of an EPS (Evolved Packet System) including an EPC (Evolved Packet Core).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): A GSM (Global System for Mobile Communication) based 3rd generation mobile communication technology developed by 3GPP EPS (Evolved Packet System): A network system including an EPC (Evolved Packet Core) which is an IP (Internet Protocol) based PS (packet switched) core network, and an access network such as an LTE/UTRAN or the like. It is a network of an evolved-UMTS type.

NodeB: A base station of GERAN/UTRAN. It is installed outdoors and has the coverage of a macro cell scale.

eNodeB: A base station of E-UTRAN. It is installed outdoors and has the coverage of a macro cell scale.

UE (User equipment): User equipment. The UE may also be called a terminal, an ME (Mobile Equipment), an MS (Mobile Station) and the like. Further, the UE may be a portable device such as a notebook computer, a mobile phone, a PDA (Personal Digital Assistant), a smartphone, a multimedia device or the like. Or, the UE may be a non-portable device such as a PC (Personal Computer), a device mounted on a vehicle or the like. In the MTC-related contents, the term "UE" or "terminal" may indicate the MTC device.

HNB (Hmoe NodeB): As a base station of an UMTS network, it is installed indoors and the coverage is a micro cell scale.

HeNB (Home eNodeB): As a base station of an EPS network, it is installed indoors and the coverage is a micro cell scale.

MME (Mobility Management Entity): A network node of the EPS network performing a Mobility Management (MM) and a Session Management (SM) function.

PDN-GW (Packet Data Network-Gateway)/PGW: A network node of the EPS network performing an UE IP address allocation, a packet screening and filtering, a charging data collection function and the like.

SGW (Serving Gateway): A network node of the EPS network, which performs mobility anchoring, packet routing, idle mode packet buffering, a function of triggering an MME to page a UE and the like.

NAS (Non-Access Stratum): An upper stratum of a control plane between an UE and an MME. As a functional layer for a signaling between an UE and a core network and an exchange of a traffic message in LTE/UMTS protocol stack, the main functions thereof are to support mobility of the UE and support a session management procedure of establishing and maintaining an IP connection between the UE and PDN GW.

PDN (Packet Data Network): A network having a server (e.g., an MMS (Multimedia Messaging Service) server, a WAP (Wireless Application Protocol) server or the like) supporting a specific service located thereon PDN connection: A logical connection between a UE and a PDN, which is expressed by a single IP address (single Ipv4 address and/or single Ipv6 prefix).

RAN (radio Access Network): A unit including a NodeB, an eNodeB and an RNC (Radio Network Controller) controlling them in a 3GPP network. It exists between UEs and provides a connection to a core network.

HLR/HSS (Home Location Register/Home Subscriber Server): Database having subscriber information within a 3GPP network. The HSS can perform functions of a configuration storage, an identify management, a user state storage and the like.

PLMN (Public Land Mobile Network): A network configured for the purpose of providing a mobile communication service to individuals. It may be configured in a manner of being divided per operator.

MTC (Machine Type Communications): Communications performed by machines without human intervention MTC device: A UE for performing an MTC. The MTC device can communicate with MTC server(s) and/or other MTC device(s) through a PLMN. The MTC device may be called an MTC UE, a UE used for the MTC, a UE configured for the MTC and the like.

MTC-IWF (MTC InterWorkingFunction): An entity playing a role as a gateway in transmitting a control signal or data for an MTC through a 3GPP network including EPS or IMS. The MTC-IWF can relay or translate a signaling protocol used on a Tsp reference point in order to invoke a specific function within a PLMN.

SCS (Services Capability Server): A server connected to a 3GPP network for communication between an MTC device on a HPLMN (Home PLMN (Public Land Mobile Network) and an MTC device using MTC-IWF. The SCS provides a capability for using a single or a plurality of applications.

MTC server: It is a server on a network managing an MTC UE and can communicate with a PLMN itself or with an MTC device through the PLMN. It may include an interface accessible by an MTC user. Further, the MTC server may provide an MTC-related service to other servers (a form of a SCS). Or, the MTC server itself may be an MTC application server (AS).

MTC application: A service having an MTC applied thereto (e.g., remote meter reading, product delivery tracking, etc.)

MTC application server (MTC AS): A server on a network having an MTC application run therein.

MTC feature: A function of a network for supporting an MTC application.

For example, an MTC monitoring is a feature for preparing for a equipment loss and the like in an MTC application. Further, a low mobility is a feature for the MTC application for an MTC device such as a vending machine.

MTC user: A user who uses a service provided by an MTC server.

MTC subscriber: An object having a connected relation with a network operator and providing a service to one or more MTC UEs.

MTC group: It shares at least one MTC feature and means a group of MTC UEs belonging to the MTC subscriber.

Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
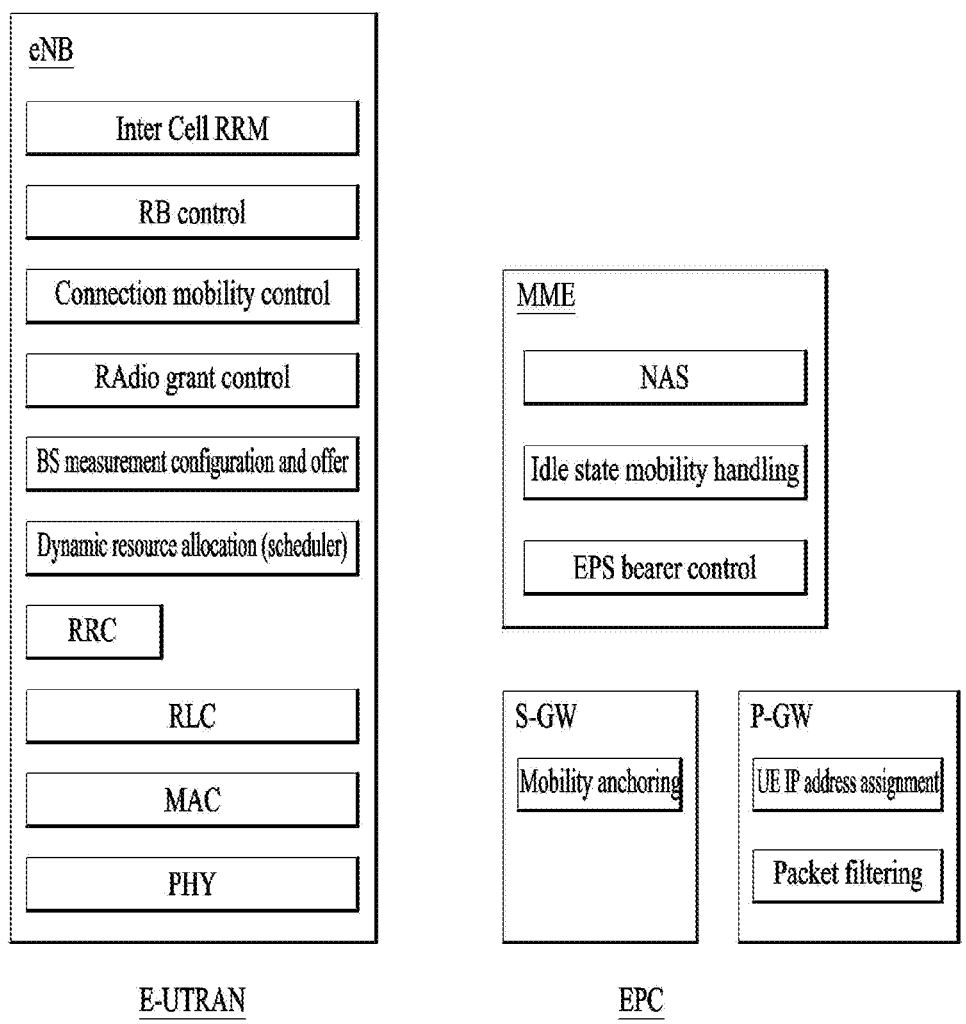
FIG. 2 is a diagram to illustrate an example of the architecture of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
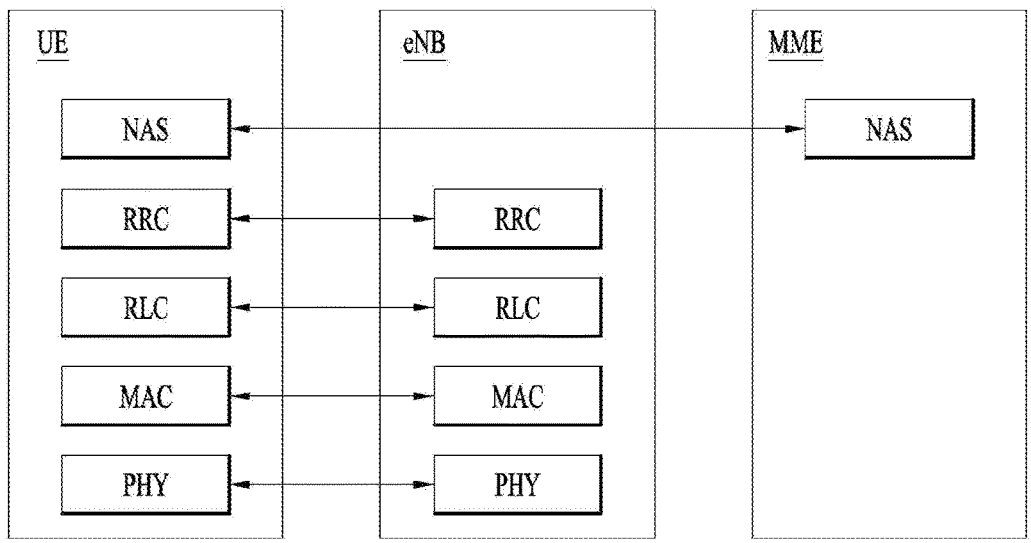
FIG. 3 is a diagram to illustrate a structure of a wireless interface protocol in a control plane.
Figure 4:
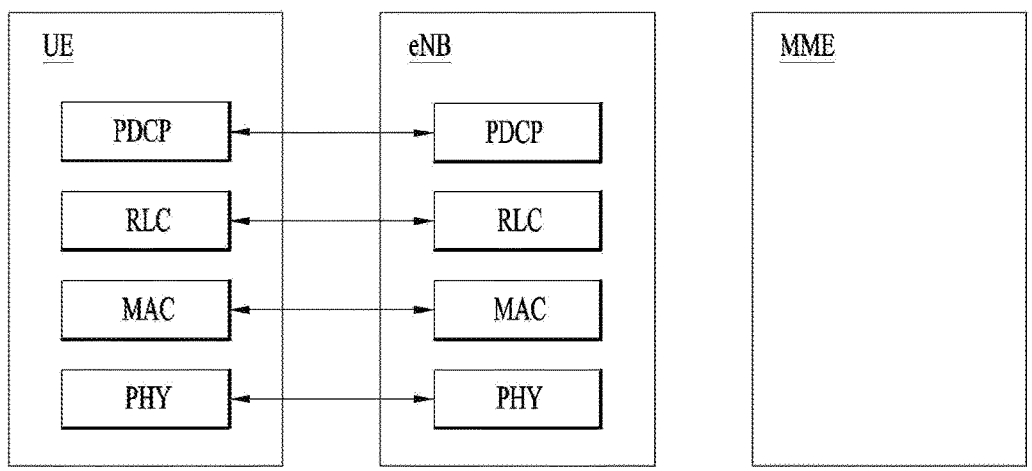
FIG. 4 is a diagram to illustrate a structure of a wireless interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell.

In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
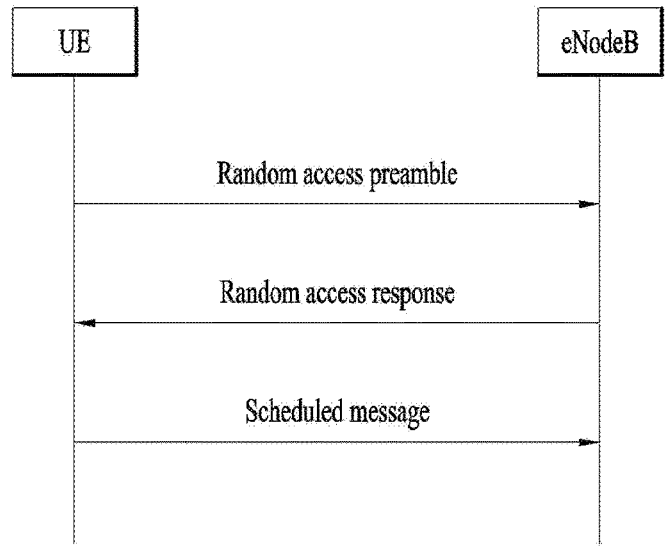
FIG. 5 is a flowchart to describe a random access process.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
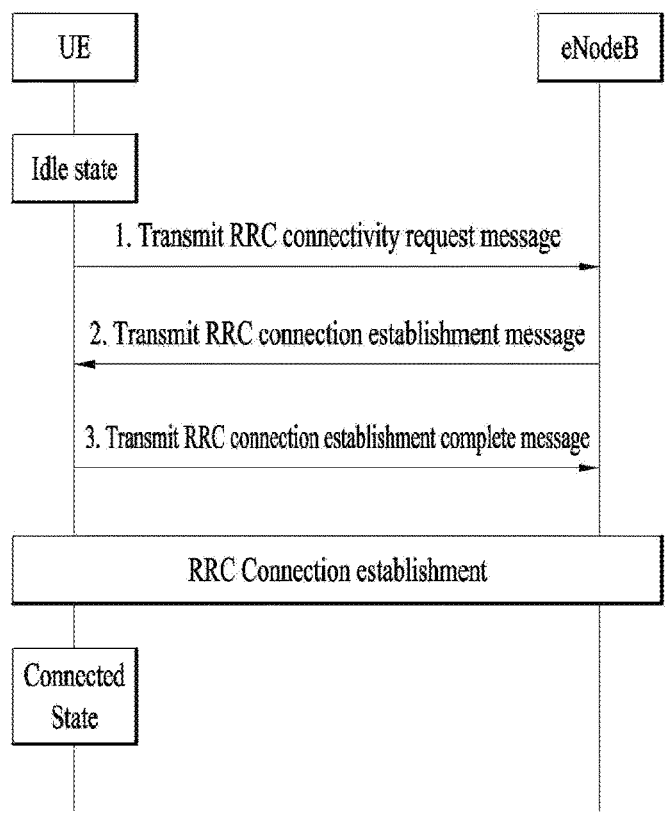
FIG. 6 is a diagram to illustrate a connection process on a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNodeB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

Figure 7:
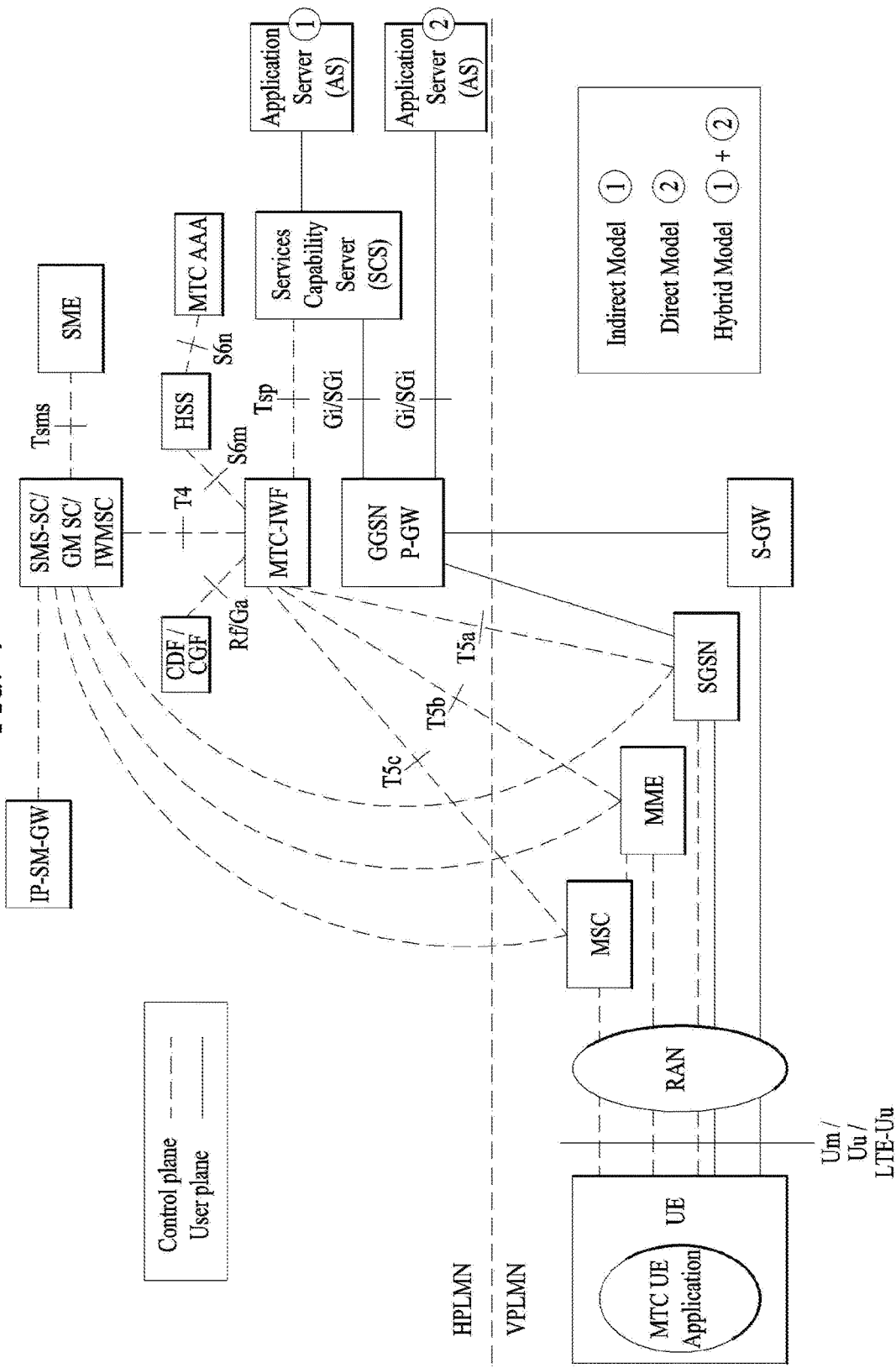
FIG. 7 is a diagram to illustrate an example of a model of an MTC structure.

FIG. 7 is a diagram to illustrate an example of a model of an MTC structure.

An end-to-end application between an UE (or MTC device) and an MTC application used for an MTC may use services provided by a 3GPP system and selective services provided by an MTC server (e.g., an SCS). The 3GPP system may provide transport and communication services (including a 3GPP bearer service, an IMS and an SMS) including various optimizations facilitating the MTC. FIG. 7 illustrates that a UE used for MTC is connected to a 3GPP network (UTRAN, E-UTRAN, GERAN, I-WLAN, etc.) through Um/Uu/LTE-Uu interface. The architecture shown in FIG. 7 includes the various MTC models described with respect to FIG. 7.

First of all, entities illustrated in FIG. 7 will be described below.

In FIG. 7, an application server (AS) is a server having an MTC application run thereon on a network and may be called an MTC application server (AS). A technology for implementing the above-described various MTC applications may apply to the MTC application server (AS) and the detailed description thereof is omitted. Further, in FIG. 7, the MTC application server (AS) may access an MTC server (e.g., an SCS according to the example shown in FIG. 7) through a reference point API, and the detailed description thereof is omitted. Further, the MTC application server (AS) may be colocated with the MTC server (e.g., SCS).

The MTC server (e.g., SCS) is a server on a network, which manages an MTC device, and may be connected to the 3GPP network so as to communicate with the UE and PLMN nodes used for the MTC.

MTC-IWF (MTC-InterWorking Function) may control an interworking between an MTC server and an operator core network and play a role as a proxy of the MTC operation. In order to support an MTC indirect or hybrid model, one or more MTC-IWFs may exist in a home PLMN (HPLMN). The MTC-IWF may operate a specific function in the PLMN by relaying or interpreting a signaling protocol on a reference point Tsp. The MTC-IWF may perform a function of authenticating an MTC server before the establishment of the communication with the 3GPP network by the MTC server, a function of authenticating a control plane request from the MTC server, various functions related to a trigger indication to be described later, and the like.

SMS-SC/IP-SM-GW (Short Message Service-Service Center/Internet Protocol Short Message GateWay) may manage transmission and reception of a short message service (SMS). The SMS-SC may be responsible for a function of relaying and storing-and-forwarding a short message between an SME (Short Message Entity) (an entity transmitting or receiving a short message) and a mobile station. The IP-SM-GW may be responsible for protocol interactions between IP-based UE and SMS-CS.

CDF/CGF (Charging Data Function/Charging Gateway Function) may perform an operation related to charging.

HLR/HSS may perform the function of storing subscriber information (IMSI, etc.), routing information, configuration information and the like and providing the stored information to MTC-IWF.

MSC (Mobile Switching Center)/SGSN/MME may perform such control functions for network connection of the UE as mobility management, authentication, resource allocation and the like. With respect to the triggering described below, the function of receiving a trigger indication from MTC-IWF and processing the trigger indication into the form of a message provided to the MTC device may be performed.

GGSN/S-GW+P-GW (Gateway GPRS Support Node/Serving-Gateway+Packet Data Network-Gateway) may perform a gateway function responsible for a connection between a core network and an external network.

Table 2 below summarizes main reference points in FIG. 7.

TABLE 2

| Reference point | Description |
|---|---|
| Tsms | It is the reference point an entity outside the 3GPP system uses to communicate with UEs used for MTS via SMS. |
| Tsp | It is the reference point an entity outside the 3GPP system uses to communicate with the MTC-IWF related control plane siganalling. |
| T4 | Reference point used by MTC-IWF to route device trigger to the SMS-SC in the HPLMN. |
| T5a | Reference point used between MTC-IWF and serving SGSN. |
| T5b | Reference point used between MTC-IWF and serving MME. |
| S6m | Reference point used by MTC-IWF to interrogate HSS/HLR for UE's identity information (E.164 MSISDN (Mobile Station International Subscriber Directory Number), external identifier mapping to IMSI, etc.) and gather UE reachability and configuration information. |

One or more reference points of the aforementioned T5a, T5b and T5c may be named T5.

Meanwhile, a user plane communication with the MTC server (e.g., the SCS) in case of an indirect and hybrid model and a communication with an MTC application server (AS) in case of a direct and hybrid model may be performed using the existing protocol through reference points Gi and Sgi.

For details related to the description with reference to FIG. 7, 3GPP TS 23.682 document may be referred to.

Problems Due to Reselection of Dedicated Core Network and MME

Figure 8:
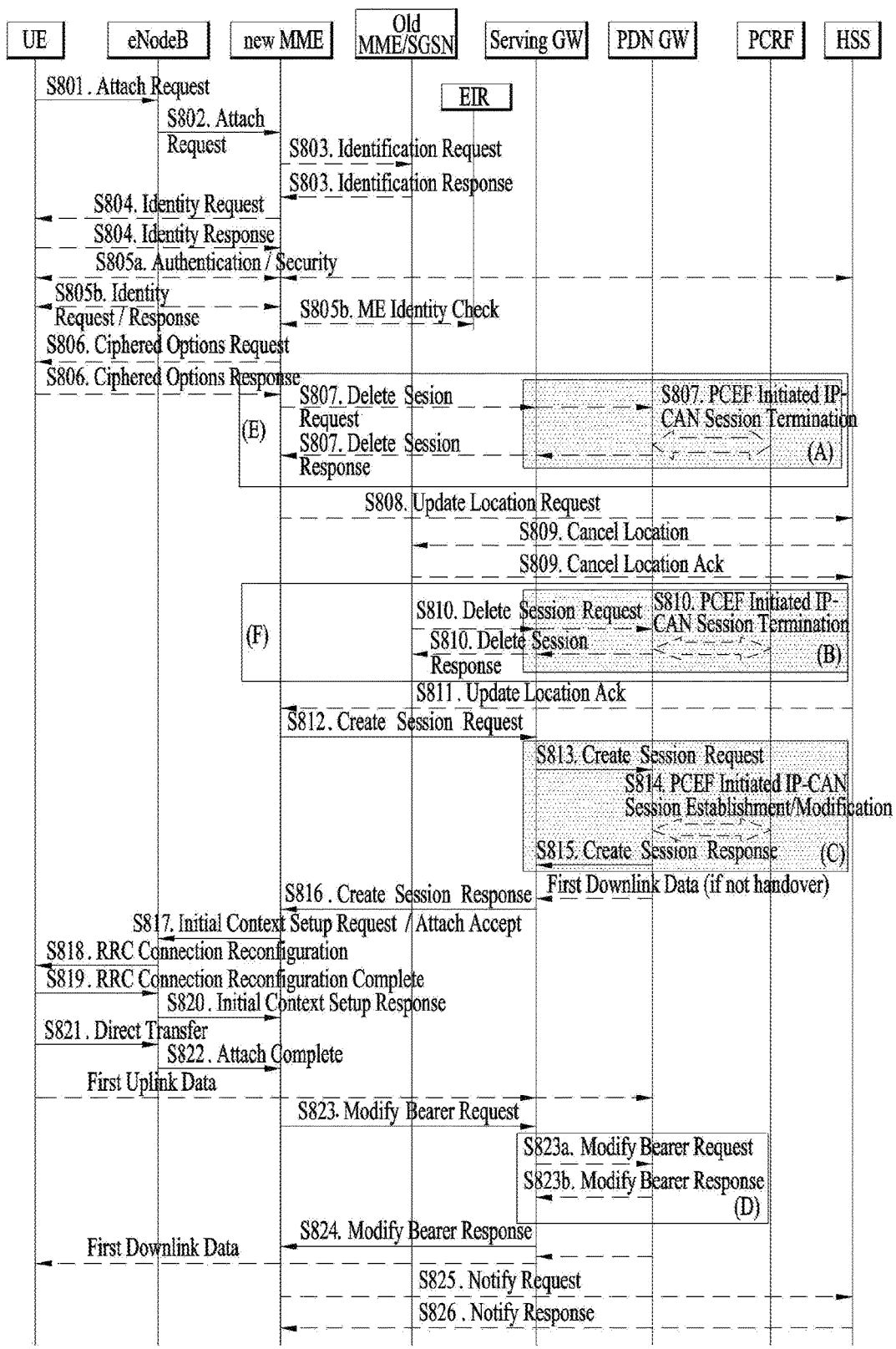
FIG. 8 and FIG. 9 are diagrams to describe a procedure related to an embodiment of the present invention.

Meanwhile, in 3GPP, a study on enabling a dedicated core network or an overlay core dedicated to UEs having the same characteristics is in progress. In this regard, in 3GPP S2-133910, a method for selecting an MME belonging to a dedicated core network capable of supporting UE's characteristics, i.e., providing an appropriate service to the UE based on UE's subscriber information in case of UE's attach has been proposed. FIG. 8 illustrates a procedure related to a selection of an MME belonging to a dedicated core network in a related art attach procedure. FIG. 8 illustrates that an old MME/SGSN exists, but it may be also described that a UE performs an operation of performing an attach by providing IMSI (International Mobile Subscriber Identity) information of its own (i.e., the old MME/SSGN does not exist for the attach performing UE). Further, for the description on each step which is not specifically described in the description below, 3GPP TS 23.401 Attach procedure can be referred to as long as harmonized with the description of the present invention.

In FIG. 8, a new MME having received an attach request transmitted from a UE may transmit a ULR (Update Location Request) to an HSS in a step S808. The HSS may transmit a ULA to the new MME in response to the ULR in a step S811. Having received the ULA, the new MME may determine whether it is appropriate that the new MME serves the UE using the Core Network Type value included in subscriber information (subscription data or subscription information). In this case, the Core Network Type value is information the HSS provides to the MME in order to direct UEs to a specific dedicated core network. If an overlay core network is supported (i.e., the dedicated core network is supported) and the new MME does not serve a UE of a dedicated specific core network type, the new MME may transmit Reroute Command (Attach Request message, Core Network Type, GUTI) to an eNodeB. The eNodeB may reselect MME based on the Core Network Type value and forward an attach request to the reselected MME.

In the above-described process, if it is not appropriate that the new MME (i.e., an initially selected MME) serves the UE and the new MME is SMS in MME (i.e., if the MME supports (Short Message Service), Annex C (Normative): SMS in MME of 3GPP TS 23.272 may be referred to for details of SMS in MME), the HSS may receive a message requesting routing information (serving node information) from SMS-GMSC (SMS-gateway Mobile Switching Centre). In doing so, the HSS transmits information on the new MME, which is not appropriate for serving the UE, to the SMS-GMSC. Therefore, the SMS-GMSC transmits an MT (mobile terminated) SM (short message), which is to be transmitted to the UE, to the new MME. In a situation before a PDN connection is established, such an SMS/MT SM transmission is performed. This is because if a serving node is determined only, the SMS can be performed unlike the case of a general IP service. Namely, the SMS is transmitted through a control plane, and thus if the HSS receives the ULR in a step S808 shown in FIG. 8, the SMS service procedure may be performed.

In a general case, although the SMS is transmitted to the new MME before the PDN connection, the new MME transmits the SMS to the UE after the end of the attach procedure, thereby causing no problem. Yet, if the new MME is changed due to failing to or being unable to service the UE, such an SMS transmission may become a problem. As described above, if the MME serving the UE is changed per Core Network Type value in the dedicated core network, it is confirmed that serving the UE is not appropriate, and the new MME having received the SMS to the UE already cannot transmit the SMS to the UE.

In such a case, the SMS to the UE can be delivered to the UE through several mandatory procedures in the following. In detail, the new MME recognizes that the new MME does not serve the UE, and then transmits Failure Report indicating the transmission failure of the MT SM to the SMS-GMSC, in a step S811 shown in FIG. 8. If the SMS-SMSC receives Failure Report from the MME, the SMS-GMSC transmits a message of reporting a delivery status of the SMS to the HSS. Of course, the transmission failure of the SM is reported based on the received Failure Report. Then, the HSS saves address information on the SMS-SC storing the SMS failing to be transmitted to the UE to MWD (Messages Waiting Data) for the UE. Thereafter, if an Update Location Request message is received from the reselected MME, the HSS transmits an alerting message to the SMS-SC currently storing the SMS failing to be transmitted via SMS-IWMSC, and the SMS-SC having received the alerting message attempts to deliver the MT SM to the UE.

Figure 9:
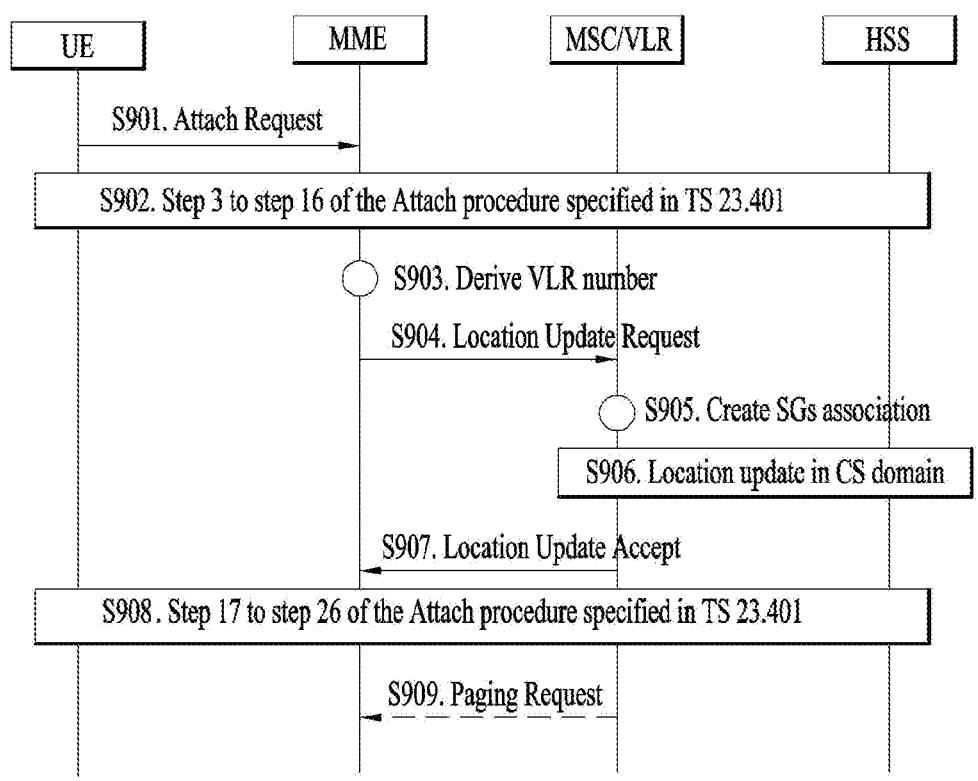

The above problem is similarly applicable to a case that the reselected MME does not support the SMS in MME. If the reselected MME does not support SMS in MME, the SMS is supported through the MSC (i.e., SMS over SGs scheme). In this case, a time taken for the HSS to recognize a serving node for transmitting MT SM is longer than a time taken for the reselected MME to support SMS in MME. Namely, referring to FIG. 9, the reselected MME selects MSC and performs a location update on behalf of a UE performing an attach to the MSC (Step S904), and the MSC performs a location update to the HSS (Step S906), whereby the HSS can recognize the serving node to transmit the MT SM.

Thus, in summary, if the SMS is already transmitted to the MME despite that the MME may be changeable, i.e., if the HSS transmits information on a new MME (i.e., initially selected MME) to the SMS-GMSC in response to the routing information request, a lot of procedures should be performed in order for the SMS to be correctly delivered to the UE. Namely, a time delay may be generated in the transmission of the MT SM to the UE, and a multitude of signalings may be generated among a multitude of nodes, which is very inefficient.

The above-described problem may become more serious if the dedicated core network is a dedicated core network for providing M2M (Machine-To-Machine) or MTC (Machine Type Communication) service and the MTC triggering is performed by the SMS. (SMS triggering is a T4-based MTC triggering and 3GPP TS 23.682 may be referred to for details thereon.) A large mount of MTC UEs simultaneously perform Attach, and the MTC server/SCS (Service Capability Server) managing the MTC UEs may perform an SMS MTC triggering in order to check whether the MTC UEs appropriately operate. Accordingly, the MME may be reselected while the large amount of MTC UEs perform attachment. In the meantime, as described above, a transmission failure in case of occurrence of MT SMS, a corresponding transmission delay and massive signalings between network nodes associated with multi-to-multi SMS transmissions are generated, whereby a situation of signaling processing congestion within a network node may increases.

Therefore, a method of transmitting and receiving a signal in HSS, MME, etc. for solving the above-described problems is considered. Namely, a method of efficiently providing an MT SMS in a dedicated core network environment is considered.

Embodiment 1

The first embodiment is a method of determining, by an HSS, whether an MME is appropriate for servicing a UE and then preventing an SMS from being transmitted to the MME if not appropriate. In this case, the determination may include a determination on whether an overlay core network is supported (namely, a dedicated core network is supported) and whether the MME does not serve a UE of a dedicated specific core network type. If the MME does not serve the UE on the dedicated core network, it may be determined that the MME is not appropriate for servicing the UE.

In particular, the HSS may receive a ULR from an MME (Mobility Management Entity) having received an attach request transmitted by the UE. Based on the ULR, the HSS may determine whether it is appropriate for the MME to service the UE. In doing so, in case of making the above determination, the HSS may use information indicating whether the MME included in the ULR belongs to a dedicated core network or information indicating whether the MME belongs to a specific type of the dedicated core network if belonging to the dedicated core network. Namely, the ULR may include one or more of the information indicating whether the MME belongs to the dedicated core network and the information indicating whether the MME belongs to a specific type of the dedicated core network if belonging to the dedicated core network.

The MME may enable information indicating whether the MME belongs to a dedicated core network to be included only if the MME belongs to the dedicated core network. If such information is not included, the HSS may regard the MME as a general MME. Further, if the MME belongs to the dedicated core network, there may exist at least one information indicating whether the MME belongs to a prescribed type, which may include a parameter in the same form of information which should be serviced from a dedicated core network of a specific type in subscriber information. For example, it may be of a Core Network Type (value) form.

For example, the determination of the HSS may be performed as follows. In the subscriber information, the UE should be provided with the service of Core Network Type=1. Yet, according to information transmitted by the MME, if Core Network Type=2 is serviced, it may be determined that this MME is an MME incapable of servicing the UE. For another example, in the subcarrier information, the UE should be provided with the service of Core Network Type=2. In this case, according to information transmitted by the MME, if this MME is an MME not belonging to a dedicated core network, it may be determined that this MME is an MME incapable of servicing the UE. Such a determination of the HSS may be performed only if the MME is an SMS in MME.

As a result of the determination, if it is determined that it is not appropriate for the MME to service the UE, the HSS may assume/recognize that the MME will be reselected, and may be then bale to update/store/mark information related to the MME. In this case, the updated/stored/marked information related to the MME may include one or more of information indicating that the MME will be reselected for the UE, information indicating that there is no MME serving the UE, information indicating that the MME does not belong to an appropriate dedicated core network for the UE, information indicating that the MME is not appropriate/suitable for the UE, and information indicating that the MME cannot be deleted/canceled at the serving node for the UE or that the MME cannot transmit an SMS at the serving node.

After the determination, the HSS may receive a message requesting routing information from the SMS-GMSC. If the HSS determines that it is not appropriate for the MME to service the UE, the HSS may not provide information on the MME to the SMS-GMSC. In other words, if it is determined that it is not appropriate for the MME to service the UE, the HSS may transmit information indicating that a user is absent (i.e., Absent User) or the user is not reachable (UE not reachable) to the SMS-GMSC. Namely, the HSS does not provide information on the serving node while responding to the SMS-GMSC.

In this case, unlike the related art, the SMS-GMSC cannot transmit an SMS to the UE to the MME to be reselected/changed, and thus the above-described problems can be solved.

According to the above description, when the MME transmits a ULR message, information related to the MME's dedicated core network is included, whereby the HSS can check whether the MME is appropriate for servicing the UE. Yet, the HSS may configure the information related to the dedicated core network for the MME in advance. In such a case, although the dedicated core network related information is not received from the MME, if a ULR message is received from the MME, it is possible to check whether the MME is appropriate for servicing the UE.

Embodiment 2

According to the second embodiment, an MME determines whether it is appropriate for the MME itself to service a UE and provides a related information to an HSS.

The MME may receive an attach request transmitted by the UE and transmit a ULR including an information request for the UE to the HSS. A ULA may be received from the HSS in response to the ULR, and it may be determined, based on the ULA, whether it is appropriate to provide a service to the UE. If it is determined that it is not appropriate to provide the service to the UE, it is possible to transmit a message explicitly or implicitly indicating one or more informations in the following to the HSS. The message may include at least one of information indicating that the MME will be reselected, information indicating that the MME itself will not serve the UE, information indicating that the MME itself does not belong to a dedicated core network appropriate for the UE, information indicating that the MME itself is not appropriate/suitable for the UE, information on a request to cancel registration of the MME itself as a serving node, and information indicating that the MME itself cannot transmit/provide an SMS.

The message may be transmitted only if the MME supports an SMS in MME. The message may include a message of an already existing form (e.g., Notify Request message) or a newly defined message. For example, if Notify Request message is used, the above effects may be obtained by configuring and sending 'Removal of MME Registration for SMS flag' in an existing NOR-Flags parameter.

A timing point for the MME to transmit a message for indicating the above information to the HSS may include one or more of the following.

First of all, the MME promptly transmits such a message to the HSS after determining that the MME is not appropriate/suitable for the UE. In this case, the meaning of the word "promptly" may indicate 'before the MME transmits a message (i.e., Reroute Command) for requesting an eNodeB to reselect an appropriate MME', 'at the same timing of the transmission' (parallel concept), or 'after the transmission'. Secondly, the MME sends a message (i.e., Reroute command) for requesting to reselect an appropriate MME to the eNodeB, receives information on the reselected MME in response thereto, and then transmits the message to the HSS. In this case, information on a newly selected MME (i.e., identifier/address/Name/ID, etc.) may also be included in the message. Thirdly, the MME reselected owing to the reselection made by the eNodeB transmits Identification Request message to an initially selected MME. If so, the MME having received the message transmits the message to the HSS. In this case, the reselected MME may enable information on itself (i.e., identifier/address/Name/ID, etc.) to be included in the Identification Request message. Further, the initially selected MME having received the message may enable information on the newly selected MME (i.e., identifier/address/Name/ID, etc.) to be included in the message transmitted to the HSS.

Although the HSS receives the message from the MME, information on the reselected MME may not be included in the message. In this case, if the HSS receives a message for requesting routing information (i.e., serving node information) for an MT SM transmission to the UE from SMS-GMSC, the HSS informs the SMS-GMSC that a user is absent (or, Absent User) or that the UE is not reachable (or, UE not reachable) in response to the received message. Namely, the HSS does not provide the information on the serving node while responding to the SMS-GMSC.

When the information on the reselected MME is included in the message, if the HSS receives the message for requesting the routing information (i.e., serving node information) for the MT SM transmission to the UE from the SMS-GMSC, the HSS provides the information on the reselected MME to the SMS-GMSC in response thereto. In this case, only if the HSS knows that the reselected MME supports SMS in MME, the HSS may provide information on the reselected MME to the SMS-GMSC as information on the serving node. If the HSS does not know whether the reselected MME supports SMS in MME, when the information on the reselected MME is not included in the above-described message, it may operate like the operation of the HSS. The HSS may get to know whether the reselected MME supports the SMS in MME by using information stored in advance in the HSS, by receiving the above information together on receiving the aforementioned message from the previous MME (the previous MME may receive this information from the reselected MME or obtain it from another node), or by obtaining the information from another node.

Embodiment 3

Third and fourth embodiments relate to methods of if an MME already receives an SMS to an UE, processing the received SMS appropriately.

If an MT SM towards the UE is received before receiving an Identification Request message from the reselected MME, the MT SM may be stored. Thereafter, if the Identification Request message is received from the reselected MME, the stored MT SM may be delivered to the reselected MME. The MT SM may be transmitted in a manner of being included in a response message to the Identification Request message, or may be transmitted as a new message.

Further, if the MT SM towards the UE is received after receiving the Identification Request message from the reselected MME, it may be delivered to the reselected MME.

In the above-described methods, when the reselected MME transmits the Identification Request message to the initially selected MME, the reselected MME may enable information on the MME itself (i.e., identifier/address/Name/ID, etc.) to be included in the message. Although the MME recognizes that it will not serve the UE, the MME may not transmit Failure Report indicating a transmission failure of the MT SM to the SMS-GMSC having transmitted the MT SM toward the UE.

Embodiment 4

In the course of an attach procedure, after an MME has received a ULA message from an HSS, the MME checks whether the MME itself is appropriate for servicing a UE performing Attach (or, service-capable). And, after determining 'not appropriate/suitable', if the MME receives MT SM towards the UE, it is able to transmit the MT SM to an eNodeB. Herein, for the eNodeB, at least one of information for requesting the MT SM to be transmitted to the UE after end/completion of the attach procedure, information indicating that the MME will be reselected, information indicating that the MME will not serve the UE, information indicating that the MME does not belong to a dedicated core network appropriate for the UE, and information indicating that the MME is not appropriate/suitable for the UE may be included.

As another example, after checking whether the MME is appropriate for serving the UE and determining that the MME is not appropriate/suitable, the eNodeB having received the MT SM towards the UE from the MME may transmit the MT SM to the UE after the end/completion of the attach procedure.

In the above description, the initially selected MME may indicate an old MME, and the reselected MME may indicate a new MME. The above description centers on the attach process, and the present invention may also apply to the Tracking Area Update procedure. Further, the attach procedure may include EPS-only Attach or Combined Attach.

In the above description, the MME may be reselected (or MME relocation or MME redirect) due to the dedicated core network, and thus the SMS delivery problem is caused and a method for solving the problem is proposed. And, the present invention is extensively applicable as a method for resolving a situation that the MME is unable to further serve the UE due to the failure in the Attach/TAU procedure after the MME supporting the SMS in MME has sent Update Location Request message to the HSS in the Attach/TAU procedure in a general network environment.

Further, in the above description, the description centers on E-UTRAN, and the present invention is also applicable in the same manner to a case that an access network is UTRAN or GERAN. In this case, SGSN can be regarded as playing a role as MME.

Meanwhile, when MME supports SMS in MME, ULR is transmitted to HSS by generally setting SMS-Register-Request information to SMS_REGISTRATION_RE-QUIRED (0), and thus the HSS may know whether the MME supports the SMS in MME.

Figure 10:
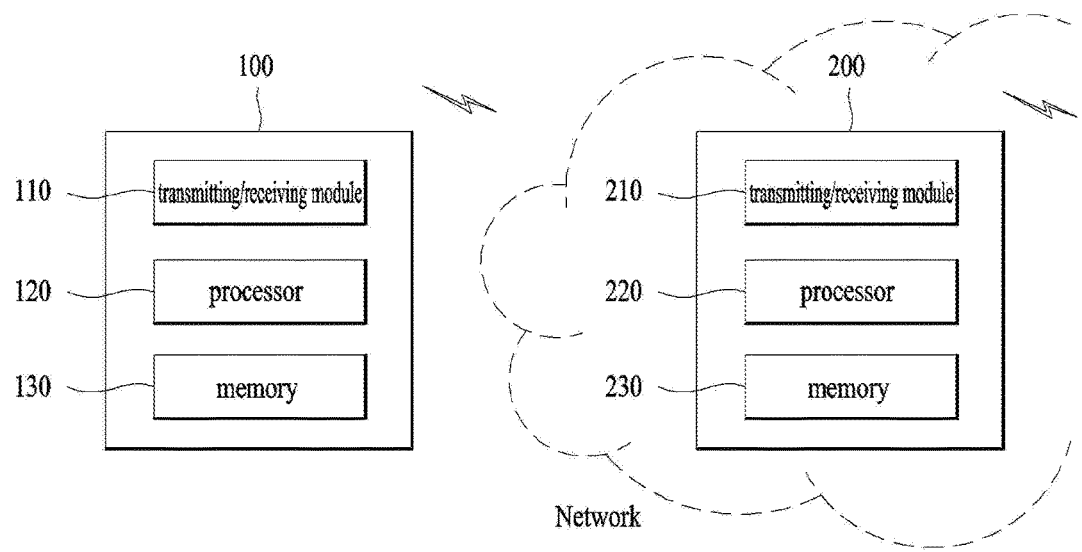
FIG. 10 is a diagram to illustrate configurations of a user equipment device and a network node device according to one embodiment of the present invention.

FIG. 10 is a diagram to illustrate a configuration of a user equipment device and a network node device according to one embodiment of the present invention.

Referring to FIG. 10, a user equipment device 100 according to the present invention may include a transmitting/receiving module 110, a processor 120 and a memory 130. The transmitting/receiving module 110 may be configured to transmit various signals, data and information to an external device and receive various signals, data and information from the external device. The user equipment device 100 may be connected to the external device by wire and/or wireless. The processor 120 may control the overall operation of the user equipment device 100, and may be configured to enable the user equipment device 100 to perform the function of operating information to be transceived with the external device. And, the processor 120 may be configured to perform the user equipment operation proposed by the present invention. The memory 130 may store the operated information for a prescribed time and may be substituted with a component such as a buffer (not shown) and the like.

Referring to FIG. 10, a network node device 200 according to the present invention may include a transmitting/receiving module 210, a processor 220 and a memory 230. The transmitting/receiving module 210 may be configured to transmit various signals, data and information to an external device and receive various signals, data and information from the external device. The network node device 200 may be connected to the external device by wire and/or wireless. The processor 220 may control the overall operation of the network node device 200 and may be configured to enable the network node device 200 to perform the function of operating information to be transceived with the external device. Moreover, the processor 220 may be configured to perform the network node operation proposed by the present invention. The memory 230 may store the operated information, etc. for a prescribed time and may be substituted with a component such as a buffer (not shown) and the like.

Moreover, the detailed configuration of the aforementioned user equipment device 100 and the network device 200 may be configured in a manner that the points described in above-described various embodiments of the present invention are independently applied or two or more embodiments are simultaneously applied, and the description of the redundant points is omitted for clarity.

The above-described embodiments of the present invention may be implemented through various means. For example, the embodiments of the present invention may be implemented by hardware, firmware, software or a combination thereof.

In case of implementation by hardware, the method according to the embodiments of the present invention may be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors and the like.

In case of implementation by firmware or software, the method according to the embodiments of the present invention may be implemented in the form of a module, a procedure, or a function for performing the above-described functions or operations. A software code may be stored in a memory unit and operated by a processor. The memory unit is located inside or outside the processor and may exchange data with the processor by already known various means.

As described above, the detailed description on the preferred embodiments of the present invention have been provided in a manner that may be implemented and performed by one of ordinary skill in the art. The above description was made with reference to various preferred embodiments of the present invention, but it may be understood by one of ordinary skill in the art that the present invention may be modified and changed in various manners within the scope of the idea of the present invention disclosed in the scope of claims below. Therefore, the present invention is not limited to the above-described embodiments but applies to the widest scope harmonized with the principles and new features disclosed in the present specification.

INDUSTRIAL APPLICABILITY

The above-described various embodiments of the present invention are applicable to various mobile communication systems.

What is claimed is:

1. A method of transmitting and receiving a signal by an HSS (home subscriber server) in a wireless communication system, the method comprising:
receiving a ULR (Update Location Request) from an MME (Mobility Management Entity) having received an attach request transmitted from a UE (User Equipment),
wherein the ULR comprises at least one of information indicating whether the MME belongs to a dedicated core network and information indicating the type of dedicated core network to which the MME belongs when the MME belongs to a dedicated core network;
determining whether it is appropriate for the MME to service the UE based on the information in the ULR; and
receiving a message requesting routing information from an SMS-GMSC (Short Message Service-gateway Mobile Switching Centre),
wherein when it is determined that the MME is not appropriate to service the UE, the HSS does not provide information on the MME to the SMS-GMSC in response to the message requesting routing information and the HSS transmits information indicating that a user is absent or not reachable by the SMS-GMSC.

2. The method of claim 1, wherein the determination is made only when the MME is an SMS in MME.

3. The method of claim 1, wherein when the MME belongs to the dedicated core network, the information indicating when the MME belongs to the dedicated core network, whether the MME belongs to the prescribed type of the dedicated core network, comprises a Core Network Type value.

4. The method of claim 1, wherein when it is determined that it is not appropriate for the MME to service the UE, the HSS assumes that the MME will be re-selected.

5. The method of claim 1, wherein when it is determined that it is not appropriate for the MME to serve the UE, the HSS updates information related to the MME.

6. The method of claim 1, wherein the updated information related to the MME comprises at least one selected from the group consisting of information indicating that the MME will be reselected for the UE, information indicating that there is no MME serving the UE, information indicating that the MME does not belong to an appropriate dedicated core network for the UE, information indicating that the MME is not appropriate/suitable for the UE, and information indicating that a serving node for the UE cannot delete/cancel the MME or the MME cannot transmit an SMS.

7. An HSS (home subscriber server) device in a wireless communication system, comprising:
a transceiver; and
a processor, operatively coupled to the transceiver,
wherein the processor is configured to:
control the transceiver to receive a ULR (Update Location Request) from an MME (Mobility Management Entity) having received an attach request transmitted by a UE (User Equipment),
wherein the ULR comprises at least one of information indicating whether the MME belongs to a dedicated core network and information indicating the type of dedicated core network to which the MME belongs when the MME belongs to a dedicated core network,
determine whether it is appropriate for the MME to service the UE based on the information in the ULR, and
control the transceiver to receive a message requesting routing information from an SMS-GMSC (Short Message Service-gateway Mobile Switching Centre),
wherein when it is determined that the MME is not appropriate to service the UE, the HSS does not provide information on the MME to the SMS-GMSC in response to receipt of the message requesting routing information and the HSS transmits information indicating that a user is absent or not reachable by the SMS-GMSC.

* * * * *